United States Patent [19]

Malone

[11] Patent Number: 4,871,603

[45] Date of Patent: Oct. 3, 1989

[54] CARPET TILE WITH CUSHIONED BACKING

[76] Inventor: Thomas J. Malone, One Twin Oaks Ct., Spartanburg, S.C. 29301

[21] Appl. No.: 251,407

[22] Filed: Sep. 29, 1988

[51] Int. Cl.$^4$ .......................... B32B 3/02; B32B 33/00
[52] U.S. Cl. ........................................ 428/95; 428/300
[58] Field of Search ................ 428/95, 286, 287, 300

[56] References Cited

U.S. PATENT DOCUMENTS

| | | | |
|---|---|---|---|
| 4,305,986 | 12/1981 | Hartmann | 428/95 |
| 4,424,250 | 1/1984 | Adams et al. | 428/198 |
| 4,522,857 | 6/1985 | Higgins | 428/95 |
| 4,647,484 | 3/1987 | Higgins | 428/40 |
| 4,725,476 | 2/1988 | Mussallem | 428/167 |

Primary Examiner—Marion C. McCamish
Attorney, Agent, or Firm—Earle R. Marden; H. William Petry

[57] ABSTRACT

A tufted or bonded carpet tile which has an integral backing material of nonwoven synthetic fibers intermingled and/or needled together to provide comfort to persons walking on same and to reduce the noise level in areas where it is installed.

3 Claims, 1 Drawing Sheet

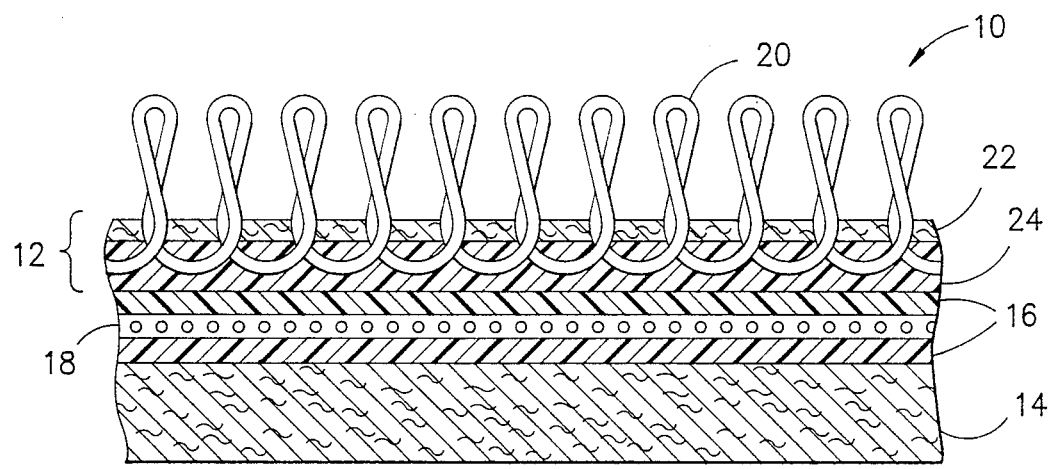
FIG. -1-
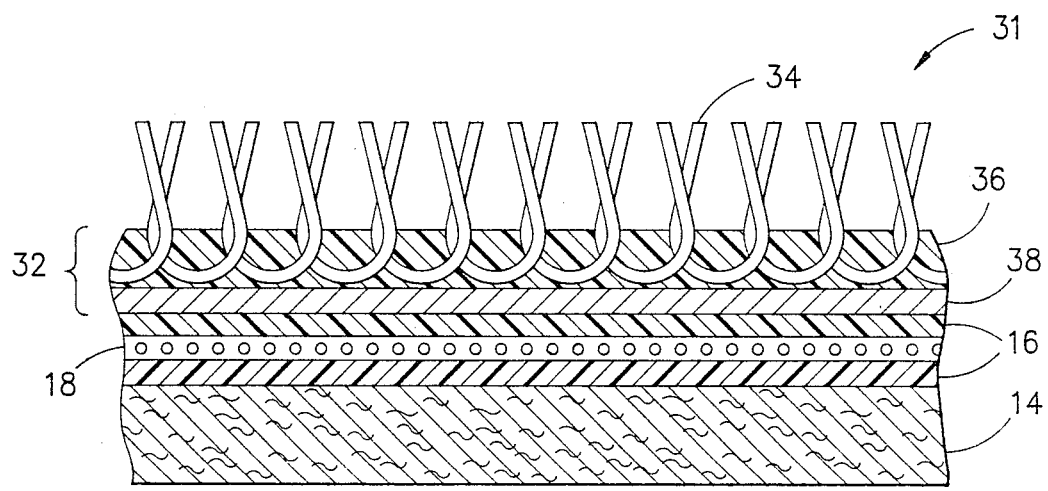
FIG. -2-

CARPET TILE WITH CUSHIONED BACKING

This invention relates to carpet tiles having a tufted or bonded carpet surface which provide improved comfort to the parties walking thereon. The improved carpet tile is preferably employed in commercial installations where comfort and reduced acoustical value is a necessity due to the long hours of constant use but, obviously, comfort is also a factor in the use of residential carpet.

Therefore, it is an object of the invention to provide a carpet tile which increases the comfort level, decreases fatigue on the person or persons walking on the installed carpet tile and is dimensionally stable.

Other objects and advantages of the invention will become readily apparent as the specification proceeds to describe the invention with reference to the accompanying drawing, in which:

FIG. 1 is a cross-sectional view taken through the new and improved tufted tile; and FIG. 2 is a view similar to FIG. 1 except it is a cross-sectional view taken through a bonded carpet tile.

Looking now to FIG. 1, a new and tufted carpet tile 10 is depicted. The carpet tile 10 basically consists of the primary carpet base 12 and the nonwoven layer 14. The primary carpet base 12 is laminated to the nonwoven layer 14 by an adhesive layer 16 in which is embedded a layer of glass scrim 18 to provide dimensional stability to the tile 10 when the adhesive layer 16 has been solidified to provide a unitary structure.

The carpet base layer 12 consists of a loop pile layer 20 of a thickness in the range of $\frac{1}{8}''$–1" created by tufting nylon continuous fibers into a primary backing 22 of woven polyester. To bond the tufts of nylon in position on the backing 22, a precoat of latex (or other suitable adhesive) 24 is applied.

As described above, the loop pile layer 20 is preferably nylon but other suitable synthetic yarns such as polyester, polypropylene, acrylic, wool, or blends thereof can be employed. The backing layer 22 is preferably woven but could be nonwoven and/or of other synthetic material such as nylon, polyester, fiberglass or polypropylene. The latex layer 24 is preferably styrene butadiene but other suitable materials such as urethane, PVC, acrylic, etc. could be employed.

The adhesive layer 16 is a layer with a thickness in the range of 0.010"–0.070" of polyolefin, modified polyolefin, polyamide or other suitable thermoplastic material with a weight in the range of 10–70 oz./sq. yard with the preferred weight being about 50 oz./sq. yard. The embedded stabilizing material is glass scrim but could be a woven or nonwoven material of glass or other suitable material such as polyester, nylon or polypropylene.

The nonwoven layer 14 is about 3/16" to $\frac{1}{4}''$ in thickness and consists of substantially all synthetic fibers such as polyester, nylon, etc. and has a weight of 20–80 oz./sq. yd. The synthetic fibers are held together in the layer by conventional methods of needle punching, air layering, etc. The particular nonwoven layer, per se, is not part of the invention except that it is important to use a nonwoven layer for better comfort as well as providing an efficient backing material at a substantially lower cost. Furthermore, the nonwoven layer is constructed to minimize shrinkage and growth to further enhance the dimensional stability of carpet tile 10.

FIG. 2 shows another embodiment of carpet tile 31 employing the same type layer base 14 and same laminating layers 16 and 18 but having a different type primary carpet base 32. The carpet base 32 basically consists of cut pile yarns 34 of nylon or other suitable material implanted in a PVC or hot melt adhesive 36 which is laminated to a reinforcement or substrate layer of a woven or nonwoven material 38 of fiberglass, nylon, polypropylene or polyester.

It can be seen that the above-described carpet tile provides a tile which has a cushioned backing with dimensional stability as well as a construction that enhances the comfort level and decreases the fatigue to a person or persons who spend a great deal of time on their feet on a carpeted area and decreases effect of noise by decreasing the acoustical value. This is especially true in commercial establishments where people spend a considerable amount of time each day.

Although the preferred embodiments of the invention have been described, it is contemplated that many changes may be made without departing from the scope or spirit of the invention and it is desired that the invention be limited only by the scope of the claims.

I claim:

1. A carpet tile comprising: a primary carpet layer having pile yarns projecting upwardly therefrom, a nonwoven base layer below said carpet layer and a thermoplastic material securing said primary carpet layer to said nonwoven base layer, said nonwoven base layer being substantially all synthetic fibers needled together to form a thickness of between 3/16" and $\frac{1}{4}''$ and a weight in the range of 20–80 ozs./yd$^2$.

2. The carpet tile of claim 1 wherein said pile yarns are pile yarns tufted into a substrate material.

3. The carpet tile of claim 2 wherein said pile yarns are pile yarns bonded to a substrate material.

* * * * *

UNITED STATES PATENT AND TRADEMARK OFFICE
CERTIFICATE OF CORRECTION

PATENT NO. : 4,871,603

DATED : October 3, 1989

INVENTOR(S) : Thomas J. Malone

It is certified that error appears in the above-identified patent and that said Letters Patent is hereby corrected as shown below:

Claim 3, line 1, delete "Claim 2" and insert --Claim 1--

Signed and Sealed this

Third Day of March, 1992

Attest:

HARRY F. MANBECK, JR.

*Attesting Officer*     *Commissioner of Patents and Trademarks*